United States Patent
Jung et al.

(10) Patent No.: US 8,855,055 B2
(45) Date of Patent: *Oct. 7, 2014

(54) METHOD FOR RECEIVING INFORMATION ON PERIPHERAL LEGACY BASE STATION IN TERMINAL OF LEGACY SUPPORT MODE

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 74 days.

This patent is subject to a terminal disclaimer.

(21) Appl. No.: 13/519,850

(22) PCT Filed: Dec. 29, 2010

(86) PCT No.: PCT/KR2010/009482
§ 371 (c)(1),
(2), (4) Date: Jun. 28, 2012

(87) PCT Pub. No.: WO2011/081433
PCT Pub. Date: Jul. 7, 2011

(65) Prior Publication Data
US 2012/0287884 A1 Nov. 15, 2012

Related U.S. Application Data

(60) Provisional application No. 61/290,870, filed on Dec. 29, 2009.

(51) Int. Cl.
*H04W 4/00* (2009.01)
*H04W 48/10* (2009.01)
(52) U.S. Cl.
CPC .................................... *H04W 48/10* (2013.01)
USPC ............................. 370/328; 370/329; 370/331
(58) Field of Classification Search
CPC ..... H04W 84/045; H04W 4/02; H04W 36/36; H04W 4/12; H04W 76/025; H04W 36/08; H04W 36/00; H04W 80/04; H04W 84/12; H04W 88/06; H04W 88/08; H04W 84/18; H04L 2012/6427; H04L 12/18
USPC .......................................... 370/328–329, 331
See application file for complete search history.

(56) References Cited

U.S. PATENT DOCUMENTS 8,094,621 B2 * 1/2012 Guo et al. ...................... 370/331
8,477,717 B2 * 7/2013 Kojima ......................... 370/331
(Continued)

FOREIGN PATENT DOCUMENTS

WO 2006-107701 10/2006

OTHER PUBLICATIONS

Xiangying Yang et al., "Zone switching operations in 16e/16m mixed mode operations", IEEE 802.16 Broadband Wireless Access Working Group, IEEE C802.16m-09/0532, Mar. 2009.

(Continued)

*Primary Examiner* — Ricky Ngo
*Assistant Examiner* — Lan Huong Truong
(74) *Attorney, Agent, or Firm* — Lee, Hong, Degerman, Kang & Waimey (57) ABSTRACT

The present invention relates to a broadband wireless access system, and more particularly, to a method for an advanced mobile station to efficiently obtain information on a peripheral legacy base station in a mobile communication system in which a legacy system and an advanced system coexist. According to one embodiment of the present invention, the present invention provides a method for a mobile station to receive information on a peripheral base station from a serving base station that operates in a mixed mode in the mobile communication system in which the legacy system and the advanced system coexist, and the method comprises the steps of: receiving a second message that includes first time information for indicating a time when a first message is broadcasted, in a first region for the legacy system of the serving base station through a second region for the advanced system of the serving base station, and receiving the first message from the first region by using the first time information.

10 Claims, 5 Drawing Sheets

(56) References Cited

U.S. PATENT DOCUMENTS

| | | |
|---|---|---|
| 2006/0030309 A1 | 2/2006 | Lee et al. |
| 2010/0002653 A1* | 1/2010 | Agiwal et al. ............... 370/331 |
| 2010/0069073 A1* | 3/2010 | Chen et al. .................. 455/437 |
| 2010/0098025 A1* | 4/2010 | Chen et al. .................. 370/331 |

OTHER PUBLICATIONS

Kyounghwan Lee et al., "Missing Scenario of Handover Process Supporting Legacy System", IEEE 802.16 Broadband Wireless Access Working Group, IEEE C802.16m-09/0063r3, Jan. 2009.

* cited by examiner

METHOD FOR RECEIVING INFORMATION ON PERIPHERAL LEGACY BASE STATION IN TERMINAL OF LEGACY SUPPORT MODE

CROSS-REFERENCE TO RELATED APPLICATIONS

This application is the National Stage filing under 35 U.S.C. 371 of International Application No. PCT/KR2010/009482, filed on Dec. 29, 2010, which claims the benefit of U.S. Provisional Application Ser. No. 61/290,870, filed on Dec. 29, 2009, the contents of which are all incorporated by reference herein in their entirety.

TECHNICAL FIELD

The present invention relates to a broadband wireless access system, and more particularly, to a method for an advanced mobile station to efficiently acquire information on a neighbor legacy base station in a mobile communication system having a legacy system and an advanced system coexist therein.

BACKGROUND ART

Generally, handover (HO) means that a mobile station moves away from a radio interface of one base station into a radio interface of another base station. In the following description, a handover procedure in a general IEEE 802.16e system is explained.

In IEEE 802.16e network, in order to inform a mobile station (hereinafter abbreviated MS) of information (e.g., topology) on a basic network configuration, a serving base station (hereinafter abbreviated SBS) is able to broadcast neighbor base station information via a neighbor advertisement (MOB_NBR-ADV) message.

In the MOB_NBR-ADV message, contained are such system information on a serving base station and neighbor base stations as a preamble index, a frequency and a handover (HO)optimization availability, DCD/UCD (downlink channel descriptor/uplink channel descriptor) information and the like.

The DCD/UCD information contains informations that should be known to a mobile station in order for the mobile station to perform information communications in DL/UL (downlink/uplink). For instance, the informations may include handover (HO) trigger information, MAC (medium access control) version information of a base station, MIH (media independent handover) capability information of a base station and the like.

In a general MOB_NBR-ADV message, informations on neighbor base stations of IEEE 802.16e type are contained. Hence, informations of neighbor base stations of types except UEEE 802.16e may be broadcasted to mobile stations via SII-ADV (service identity information advertisement) message. Accordingly, the mobile station may be able to acquire informations of a heterogeneous network base station by making a request for a serving base station to send the SII-ADV message.

In the following description, a procedure for a mobile station, which has acquired information on a neighbor base station by the above-described method, to perform a handover on IEEE 802.16e network is explained in detail.

Generally, a handover procedure on a general IEEE 802.16e network may mainly consist of three kinds of procedures including handover (HO) initiation & preparation, handover (HO) execution and handover (HO) completion.

One example of a basic handover procedure, which may be configured in the above manner, is described with reference to FIG. 1 as follows.

Figure 1:
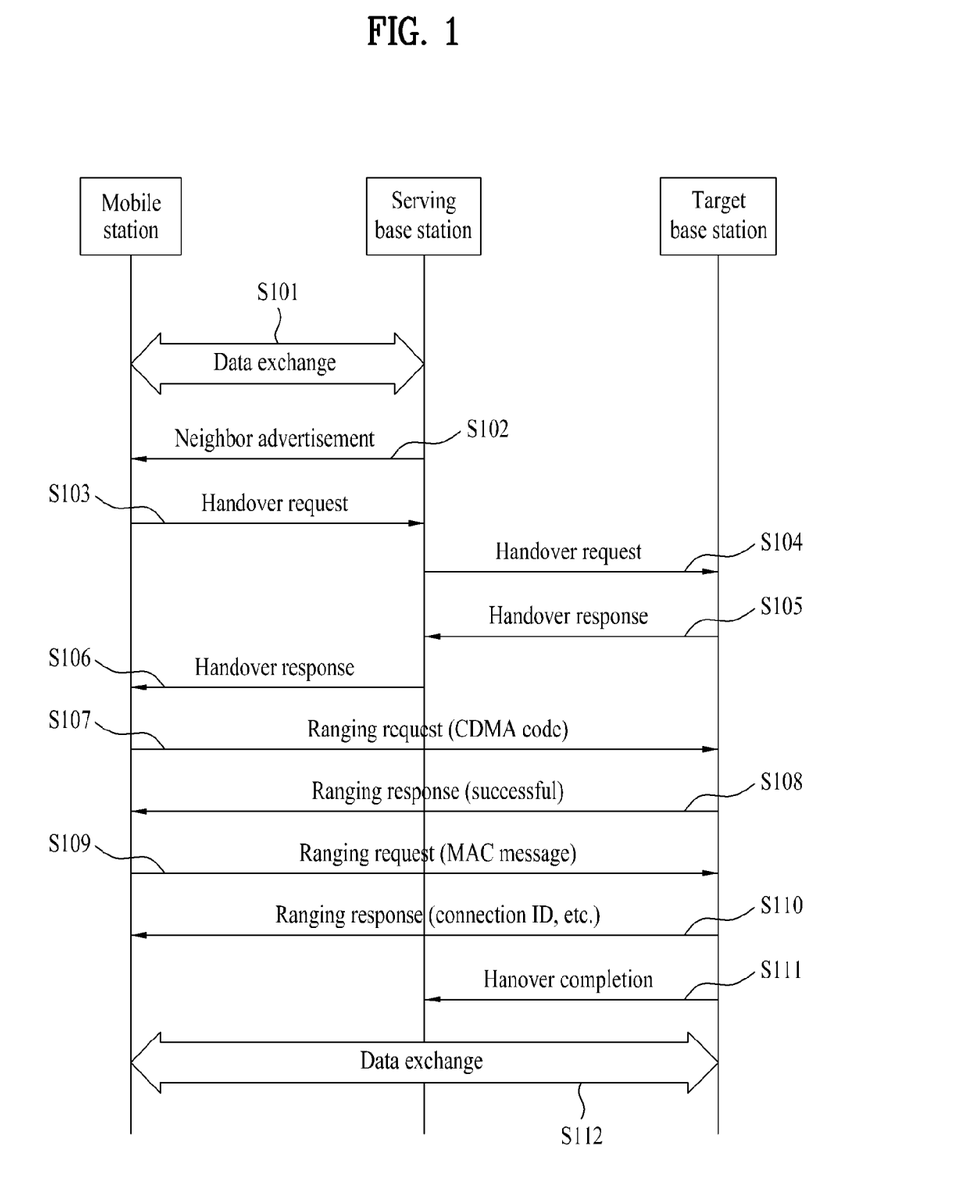
FIG. 1 shows one example of a handover procedure executable in IEEE 802.16e system.

FIG. 1 shows one example of a handover procedure executable in a general IEEE 802.16e system.

Referring to FIG. 1, first of all, a mobile station (MS) is connected with a serving base station (SBS) and is then able to perform a data exchange [S101].

The serving base station periodically broadcasts information on a neighbor base station neighboring to the serving base station to the mobile station via MOB_NBR-ADV message [S102].

In the course of communicating with the serving base station, the mobile station is able to start scanning candidate base stations (candidate HO BSs) using a handover trigger condition. If such a handover condition as a prescribed hysterisis margin is exceeded, the mobile station is able to make a request for a handover procedure execution to the serving base station by sending a handover request (MOB_MSHO-REQ) message [S103].

The serving base station is able to notify the handover request made by the mobile station to the candidate base stations (candidate HO BSs) contained in the MOB_MSHO-REQ message [S104].

Each of the candidate base stations (candidate HO BSs) takes a preemptive step for the mobile station having made the request for the handover and is then able to deliver informations related to the handover to the serving base station via HO-RSP message [S105].

The serving base station is able to deliver the handover related informations, which are obtained from the candidate base stations (candidate HO BSs) via the HO-RSP messages, to the mobile station via handover response (MOB_BSHO-RSP) message. In this case, in the MOB_BSHO-RSP message, such information for performing the handover as an action time for the handover, a handover identifier (HO-ID), a dedicated handover (HO) CDMA ranging code and the like can be included [S106].

Based on the information included in the MOB_BSHO-RSP message received from the serving base station, the mobile station is able to determine a target base station among the candidate base stations. Subsequently, the mobile station is able to attempt a ranging by transmitting CDMA code to the determined target base station [S107].

Having received the CDMA code, the target base station is able to transmit a success or failure of the ranging and physical correction values to the mobile station via a ranging response (RNG-RSP) message [S108].

Subsequently, the mobile station is able to send a ranging request (RNG-REQ) message for authentication to the target base station [S109].

Having received the ranging request message, the target base station is able to provide the mobile station with such system information usable by the corresponding base station as CID (connection identifier) and the like via a ranging response message [S110].

If the target base station successfully completes the authentication of the mobile station and sends all update information, it may be able to notify a success or failure of the handover to the serving base station of the mobile station via a handover complete message (HO-CMPT) [S111].

Thereafter, the mobile station is able to perform information exchange with the handover performed base station [S112].

The above-described handover process is assumed as performed between a mobile station and a base station in accordance with IEEE 902.16e specification (e.g., WirelessMAN- OFDMA R1 Reference System). For clarity of the following description, a system, to which a general technology including IEEE 802.16e specification is applied, is named 'legacy system'. And, a mobile station, to which a legacy technology is applied, is named 'YMS (yardstick MS)' or a 'legacy mobile station'. Moreover, a base station, to which a legacy technology is applied, is named 'legacy base station', 'R1 BS' or 'YBS (yardstick BS)'.

And, a mobile station, to which a technology (e.g., IEEE 802.16m specification: WirelessMAN-OFDMA Advanced System) further advanced than a general technology is applied, is named 'AMS (advanced MS)' or 'advanced mobile station'. And, a base station, to which the advanced technology is applied, is named 'ABS (advanced BS)' or 'advanced base station'.

YBS just has a legacy zone (hereinafter abbreviated L zone or LZone) having a physical channel frame structure applied to a legacy system. And, ABS supports AMS only or may support both AMS and YMS simultaneously. In case that ABS support AMS only (e.g., WirelessMAC-OFDMA advanced system only), ABS just has an advanced mobile station support zone (hereinafter named M zone or MZone) having a physical channel frame structure applied to an advanced system. ABS supporting both AMS and YMS (WirelessMAC-OFDMA Reference System/WirelessMAC-OFDMA Advanced Co-existing System: legacy supportive) may operate in mixed mode. In the following description, this mixed mode operation is explained on the assumption that a legacy system and an advanced system include IEEE 802.16e system and IEEE 802.16m system, respectively. ABS operating in mixed mode has both a legacy zone and an advanced mobile station supportive zone. An uplink (UL) region in mixed mode may be able to operate in a manner of being divided into L zone and M zone by TDM (time division multiplexing) or FDM (frequency division multiplexing).

Moreover, AMS is able to receive services from ABS and YBS both. In particular, the AMS is able to receive a service via one of an advanced mobile station supportive zone and a legacy zone. And, the AMS is able to perform both a handover performing process defined in a legacy system and a handover performing process defined in an advanced system. In the following description, this mixed mode operation is explained on the assumption that a legacy system and an advanced system include IEEE 802.16e system and IEEE 802.16m system, respectively.

Generally, while AMS is receiving a service in MZone of a serving ABS capable of supporting AMD and YMS both, it may happen that the AMS has to perform a handover into a legacy base station or LZone of another ABS. In doing so, a process of a network reentry into a target base station (i.e., YBS or LZone of ABS operating in mixed mode) may follow a procedure defined in the legacy system. Before following the defined process, it may be necessary for the AMS to acquire information on a neighbor legacy base station (or a legacy system supportive base station).

However, if a serving base station broadcasts information on a neighbor YBS via a neighbor advertisement (AAI_NBR-ADV) message, duplicative information is broadcasted from the LZone via a neighbor advertisement (MOB-NBR-ADV) message. In particular, a list of neighbor YBSs is broadcasted from the LZone of the ABS for YMSs. If the list of the neighbor YBSs is broadcasted from MZone of the ABS as well, the base station broadcasts the duplicative information so that the mobile station receives the duplicative information.

DISCLOSURE OF THE INVENTION

Technical Tasks

Accordingly, the present invention is directed to substantially obviate one or more problems due to limitations and disadvantages of the related art. First of all, an object of the present invention is to provide a method for an advanced mobile station to efficiently acquire system information of a neighbor legacy base station and apparatus for performing the same.

Another object of the present invention is to provide a method of informing an advanced mobile station of neighbor legacy base station information efficiently and apparatus for performing the same, by which an advanced base station can be prevented from wasting radio resources.

Technical tasks obtainable from the present invention are non-limited the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving information on a neighbor base station, which is received by an advanced mobile station (AMS) from a serving base station operating in a mixed mode in a mobile communication system having a legacy system and an advanced system coexist therein, according to one embodiment of the present invention may include the steps of receiving a $2^{nd}$ message including a $1^{st}$ time information indicating a time of broadcasting a $1^{st}$ message from a $1^{st}$ zone for the legacy system of the serving base station via a $2^{nd}$ zone for the legacy system of the serving base station and receiving the $1^{st}$ message from the $1^{st}$ zone using the $1^{st}$ time information, wherein the $1^{st}$ message includes system information on at least one of a base station supporting the legacy system around the serving base station and the $1^{st}$ zone of a base station operating in the mixed mode around the serving base station.

Preferably, the $1^{st}$ time information may include at least one selected from the group consisting of an offset information indicating the time of broadcasting the $1^{st}$ message from the $1^{st}$ zone as an offset from a time of receiving the $2^{nd}$ message and an interval information indicating an interval of broadcasting the $1^{st}$ message from the $1^{st}$ zone.

More preferably, each of the offset information and the interval information may be determined by a frame unit.

In this case, the $1^{st}$ message may further include a $2^{nd}$ time information indicating a time of transmitting the system information of the $1^{st}$ zone and the method may further include the step of receiving the system information of the $1^{st}$ zone using the $2^{nd}$ time information.

Preferably, the legacy system may include WirelessMAN-OFDMA R1 reference system, the advanced system may include IEEE 802.16m system, the $1^{st}$ message may include a neighbor advertisement (MOB_NBR-ADV0 message, and the $2^{nd}$ message may include an advanced neighbor advertisement (AAI_NBR-ADV) message.

To further achieve these and other advantages and in accordance with the purpose of the present invention, a mobile station device, which receives information on a neighbor base station from a serving base station operating in a mixed mode in a mobile communication system having a legacy system and an advanced system coexist therein, according to one embodiment of the present invention may include a processor and a radio communication (RF) module configured to transceive radio signals with the serving base station under control of the processor, wherein the processor controls the radio communication (RF) module to receive a $2^{nd}$ message including a $1^{st}$ time information indicating a time of broadcasting a $1^{st}$ message from a $1^{st}$ zone for the legacy system of the serving base station via a $2^{nd}$ zone for the legacy system of the serving base station, wherein the processor controls the radio communication (RF) module to receive the $1^{st}$ message from the $1^{st}$ zone using the $1^{st}$ time information, and wherein the $1^{st}$ message includes system information on at least one of a base station supporting the legacy system around the serving base station and the $1^{st}$ zone of a base station operating in the mixed mode around the serving base station.

Preferably, the $1^{st}$ time information may include at least one selected from the group consisting of an offset information indicating the time of broadcasting the $1^{st}$ message from the $1^{st}$ zone as an offset from a time of receiving the $2^{nd}$ message and an interval information indicating an interval of broadcasting the $1^{st}$ message from the $1^{st}$ zone.

More preferably, each of the offset information and the interval information may be determined by a frame unit.

In this case, the $1^{st}$ message may further include a $2^{nd}$ time information indicating a time of transmitting the system information of the $1^{st}$ zone and the processor may control the system information of the $1^{st}$ zone to be received using the $2^{nd}$ time information.

Preferably, the legacy system may include WirelessMAN-OFDMA R1 reference system, the advanced system may include IEEE 802.16m system, the $1^{st}$ message may include a neighbor advertisement (MOB_NBR-ADV0 message, and the $2^{nd}$ message may include an advanced neighbor advertisement (AAI_NBR-ADV) message.

To further achieve these and other advantages and in accordance with the purpose of the present invention, a method of receiving a neighbor base station information, which is received by an advanced mobile station (AMS) from a serving advanced base station (ABS) in a broadband wireless access system, according to another embodiment of the present invention may include the steps of transmitting a $1^{st}$ message including a base station type information to the serving advanced base station and receiving a $2^{nd}$ message including the neighbor base station information of a type indicated by the base station type information from the serving advanced base station in response to the $1^{st}$ message.

Preferably, the base station type information may be set to a value indicating one selected from the group consisting of a closed subscriber group-closed femto base station (CSG-Closed Femto ABS), a closed subscriber group-open femto base station (CSG-Open Femto ABS) and an open subscriber group femto base station (OSG Femto ABS).

More preferably, the $1^{st}$ message may include a scan reporting (AAI_SCN-REP) message and the $2^{nd}$ message may include a neighbor advertisement (AAI_NBR-ADV) message transmitted by unicast.

To further achieve these and other advantages and in accordance with the purpose of the present invention, a mobile station device, which receives a neighbor base station information from a serving advanced base station (ABS) in a broadband wireless access system, according to another embodiment of the present invention may include a processor and a radio communication (RF) module configured to transceive radio signals with the serving advanced base station under control of the processor, wherein the processor controls the radio communication (RF) module to transmit a $1^{st}$ message including a base station type information to the serving advanced base station and wherein the processor controls the radio communication (RF) module to receive a $2^{nd}$ message including the neighbor base station information of a type indicated by the base station type information from the serving advanced base station in response to the $1^{st}$ message.

Preferably, the base station type information may be set to a value indicating one selected from the group consisting of a closed subscriber group-closed femto base station (CSG-Closed Femto ABS), a closed subscriber group-open femto base station (CSG-Open Femto ABS) and an open subscriber group femto base station (OSG Femto ABS), the $1^{st}$ message may include a scan reporting (AAI_SCN-REP) message, and the $2^{nd}$ message may include a neighbor advertisement (AAI_NBR-ADV) message transmitted by unicast.

Advantageous Effects

According to at last one embodiment of the present invention, a mobile station acquires information for receiving a message containing neighbor legacy base station information broadcasted from L zone of a corresponding base station via a message broadcasted from M zone of the corresponding base station operating in a mixed mode and may be then able to efficiently acquire the neighbor legacy base station information from the L zone.

Moreover, since a neighbor legacy base station information broadcasted via L zone may not be duplicatively contained in broadcast information of M zone, the present invention may be able to prevent an advanced base station from wasting radio resources.

Effects obtainable from the present invention are non-limited the above mentioned effect. And, other unmentioned effects can be clearly understood from the following description by those having ordinary skill in the technical field to which the present invention pertains.

MODE FOR INVENTION

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other network nodes except the base station. In this case, 'base station (BS)' can be replaced by such a terminology as a fixed station, a Node B, an eNode B (eNB), an access point, an advanced base station (ABS) and the like. And, 'terminal' can be replaced by such a terminology as a user equipment (UE), a mobile station (MS), a mobile subscriber station (MSS), and advanced mobile station (AMS), a subscriber station (SS) and the like.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by the above standard documents. Specifically, embodiments of the present invention can be supported by at least one of P802.16-2004, P802.16e-2005, P802.16Rev2 and IEEE P802.16m documents which are the standard documents of IEEE 802.16 system.

In the following description, specific terminologies are provided to help the understanding of the present invention. And, the use of the specific terminology can be modified into another form within the scope of the technical idea of the present invention.

1$^{st}$ Embodiment

According to the present embodiment in the following description, assume a case that AMS is receiving a service from MZone of ABS operating in a mixed mode and that the AMS needs information on a neighbor legacy base station for the purpose of performing a handover into the neighbor legacy base station.

In the ABS operating in the mixed mode, system information of a neighbor legacy base station is contained in a neighbor advertisement (MOB_NBR-ADV) message broadcasted from LZone. Yet, in order for the AMS receiving the service from the MZone to acquire information on neighbor base stations including a legacy base station, if the AMS always receives both MOB-NBR-ADV message of the LZone and AAI_NBR-ADV message of the MZone together, it may be very inefficient. Moreover, the MOB-NBR-ADV message of the LZone has a relatively long transmission interval. If the AMS attempt a reception without knowing a transmission time of the corresponding message, it may cause an unnecessary time delay. Therefore, according to the present embodiment, in case that LZone of a legacy base station or ABS exists around, scheduling information of the MOB-NBR-ADV message of the LZone is proposed to be contained in the AAI_NBR-ADV message of the MZone. If the scheduling information of the MOB-NBR-ADV message is contained in the AAI_NBR-ADV message, a mobile station may be aware that the LZone of the legacy base station or ABS exists around the mobile station.

In particular, the information on a time of sending the MOB_NBR-ADV message may be contained in the scheduling information of the MOB_NBR-ADV message.

The time of sending the MOB_NBR-ADV message may be contained in the AAI_NBR-ADV message in a manner of having a format of 'neighbor advertisement offset' or 'NBR-ADV offset' field. A value of the neighbor advertisement offset field may be set by a frame unit. In this case, it may be indicated that the MOB_NBR-ADV message will be sent from LZone after duration of a frame amounting to a value of the neighbor advertisement offset field after transmission of the AAI_NBR-ADV message.

And, the transmission interval information of the MOB_NBR-ADV message may be contained in the scheduling information of the MOB_NBR-ADV message. In this case, the interval information may be contained in the AAI_NBR-ADV message in a manner of having a format of 'neighbor advertisement interval' or 'NBR-ADV interval' field. This field may be set by a frame unit as well. Through this field, if the mobile station fails in reception of the MOB_NBR-ADV message sent from the LZone at the time according to the neighbor advertisement offset field, the mobile station may be able to receive the MOB_NBR-ADV message broadcasted again from the LZone after duration of a frame indicated by the neighbor advertisement interval field value without decoding the LZone continuously until a next transmission interval.

According to the above-described proposal, a legacy base station information acquiring procedure and a corresponding handover procedure are described with reference to FIG. 2 as follows.

Figure 2:
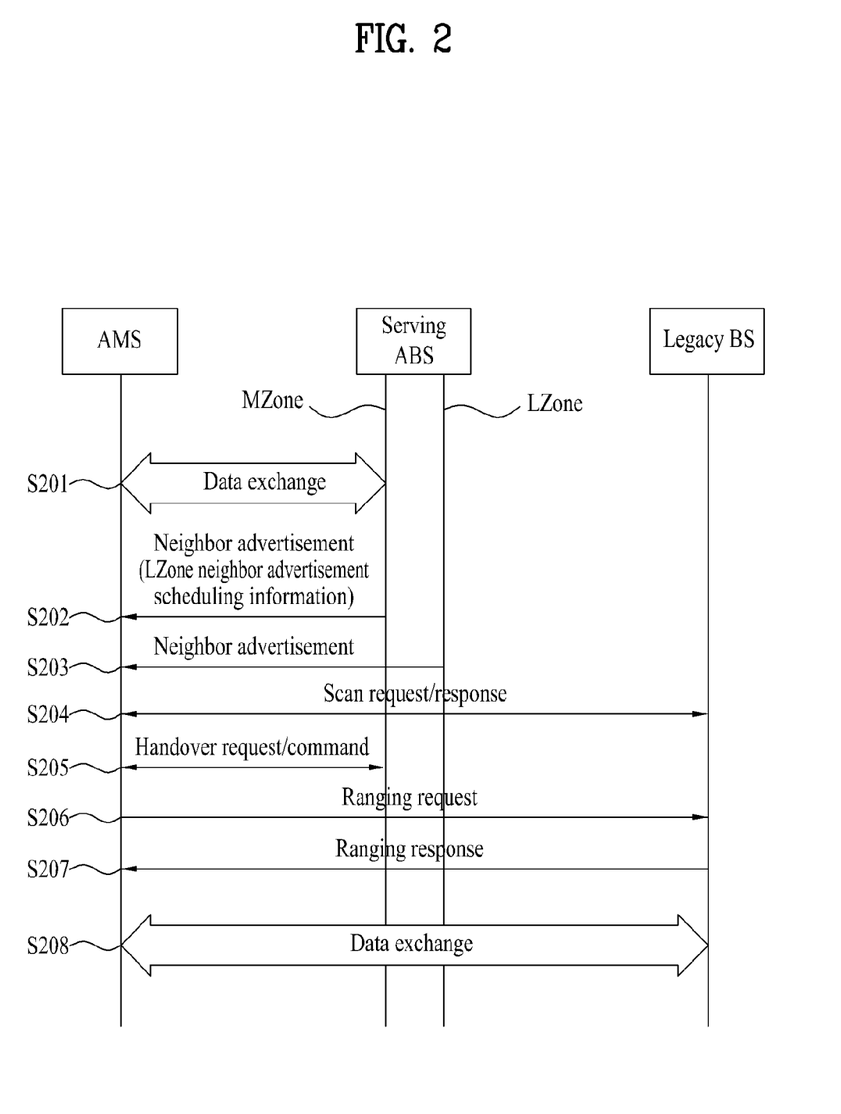
FIG. 2 shows one example of a procedure for an advanced mobile station to acquire legacy base station information and a corresponding handover procedure according to one embodiment of the present invention.

In FIG. 2, assume that a legacy base station exists around a serving ABS operating in a mixed mode.

Referring to FIG. 2, while a mobile station (AMS) enters MZone of a serving ABS operating in a mixed mode and then performs a data exchange [S201], the mobile station may be able to receive a neighbor advertisement (AAI_NBR-ADV) message from the MZone of the serving ABS [S202].

In doing so, scheduling information of the neighbor advertisement (MOB_NBR-ADV) message of the LZone is contained in the AAI_NBR-ADV message. The mobile station receives the MOB_NBR-ADV message of the LZone at the time indicated by a neighbor advertisement interval field of the scheduling information and may be then able to acquire information on a neighbor legacy base station [S203]. In doing so, before receiving the MOB_NBR-ADV message, the mobile station may have received system information (UCD/DCD) of the LZone.

Having acquired the neighbor legacy base station without unnecessary standby time using the scheduling information of the neighbor advertisement (MOB_NBR-ADV) message, the mobile station may be able to attempt scanning of the legacy base station using the acquired information [S204].

Subsequently, the mobile station determines a handover into the legacy base station and may be then able to make a request for the handover into the legacy base station through handover request/command (AAI_HO-REQ/CMD) message exchanges with the serving ABS [S205].

Thereafter, the mobile station performs a network reentry procedure, which includes a ranging request message exchange with the legacy base station and a response message exchange with the legacy base station, on the legacy base station [S206, S207] and may be then able to normally perform data exchanges with the legacy base station [S208].

Since the above-mentioned steps S206 to S208 are similar to the former steps S107 to S112 described with reference to FIG. 1, their duplicative details shall be omitted for clarity of the following description.

In the following description, when various base stations exist around, a process for acquiring legacy base station information and a process for performing a handover are explained with reference to FIG. 3.

Figure 3:
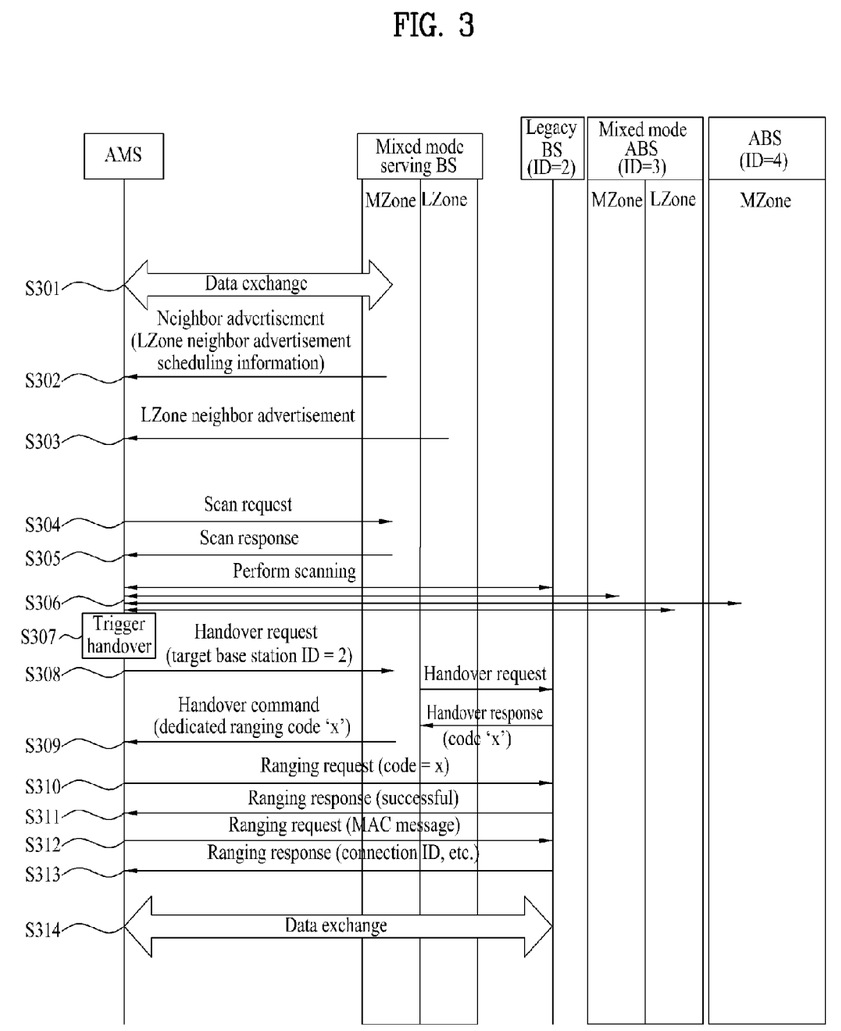
FIG. 3 shows one example of a procedure for an advanced mobile station to acquire legacy base station information and a corresponding handover procedure according to one embodiment of the present invention in aspect of relation with neighbor base stations.

FIG. 3 shows one example of a procedure for an advanced mobile station to acquire legacy base station information and a corresponding handover procedure according to one embodiment of the present invention in aspect of relation with neighbor base stations.

In FIG. 3, assume that a mobile station (AMS) is receiving a service from MZone of a serving ABS operating in a mixed mode and that a legacy base station (BSID=2), an ABS (BSID=3) operating in a mixed mode and a 16m only ABS (BSID=4) exist around the serving ABS. Moreover, if the AMS performs a handover into a legacy base station, assume that the AMS performs a fast handover provided by a general IEEE 802.16 system.

Referring to FIG. 3, while a mobile station (AMS) is receiving a service from MZone of a serving ABS operating in a mixed mode [S301], it may be able to receive a neighbor advertisement (AAI_NBR-ADV) message from the MZone of the serving ABS [S302].

In this case, in the AAI_NBR-ADV message, MZone information of the ABS having the BSID set to 3, information on the ABS having the BSID set to 4 and scheduling information of the neighbor advertisement (MOB_NBR-ADV) message broadcasted from the LZone are contained. The mobile station receives the MOB_NBR-ADV message of the LZone at the time indicated by a neighbor advertisement interval field of the scheduling information and may be then able to information on a neighbor legacy base station without unnecessary standby time [S303]. In doing so, in the MOB_NBR-ADV message, LZone information of the ABS having the BSID set to 3 and information on a legacy base station having the BSID set to 2 may be contained. Moreover, before receiving the MOB_NBR-ADV message, the mobile station may have received system information (UCD/DCD) of the LZone in advance.

Having acquired the neighbor base station information via the MOB_NBR-ADV message and the AAI_NBR-ADV message, the mobile station may make a request for performing a scanning to the serving ABS in order to perform a scanning on neighbor base stations [S304] and may then receive scanning related information such as a scanning interval and the like in response to the scanning request [S305].

Using the acquired scanning and neighbor base station related informations, the mobile station may be able to attempt the scanning of the neighbor base stations including the legacy base station [S306].

Subsequently, the mobile station triggers a handover in accordance with a prescribed handover triggering condition [S307] and may then send a handover request (AAI_HO-REQ) message to the serving ABS [S308]. In doing so, via the handover request message, the mobile station may inform the serving ABS that a desired target base station is the legacy base station.

Correspondingly, the serving ABS exchanges information on the mobile station and the handover related information with the legacy base station (or candidate base stations including the legacy base station) via backbone network messages. In doing so, the legacy base station may inform the serving ABS of a dedicated ranging code (herein assumed as 'x') for the fast handover. Having received the handover related information from the legacy base station, the serving ABS delivers information on the candidate base station to the mobile station via a handover command (AAI_HO-CMD) message [S309]. In doing so, in the handover command message, the dedicated ranging code information delivered from the legacy base station is contained.

The mobile station determines the handover into the legacy base station (BSID=2) and then transmits a dedicated ranging code to the legacy base station [S310]. In doing so, the transmission of the ranging code may be performed at the time indicated by an action time field contained in the AAI_HO-CMD message.

Having received the dedicated ranging code, the legacy base station may be able to transmit a failure or success of the ranging and physical correction values to the mobile station via a ranging response (RNG-RSP) message [S311].

Subsequently, the mobile station may be able to send a ranging request (RNG-REQ) message to the legacy base station [S312].

Having received the ranging request message, a target base station may be able to provide the mobile station with such system information usable for the corresponding base station as a connection identifier (CID) and the like via a ranging response message [S313].

Thereafter, the mobile station performs the rest of the network reentry procedure and may be then able to normally perform a data exchange with the legacy base station [S314].

Meanwhile, according to another embodiment, it may be proposed that information on a time of transmitting system information of LZone is further included in scheduling information of MOB_NBR-ADV message.

In order for a mobile station to receive a neighbor advertisement message broadcasted from LZone, it may be necessary to acquire system information (i.e., DCD/UCD) of the LZone in the first place. This is because a system information of a corresponding base station and a system information (i.e., delta information) of a neighbor base station, which is different from the information of the corresponding base station, are included in the MOB_NBR-ADV message. And, the AMS needs to know the system information of the LZone to receive the MOB_NBR-ADV message. In doing so, the information on the transmission time of the system information of the LZone preferably indicates a transmission time of DCD/UCD which is transmitted prior to the MOB_NBR-ADV message indicated by a neighbor advertisement offset field. In this case, the AMS receives the system information of the LZone at the time indicated by the information on the transmission time of the system information of the LZone and may be then able to receive the MOB_NBR-ADV message of the LZone at the time indicated by the neighbor advertisement offset field.

2nd Embodiment

According to another embodiment of the present invention, while a mobile station (AMS) is receiving a service from an advance base station (16m-only ABS) which does not support a legacy, a method of requesting information on a neighbor legacy base station to a serving base station and receiving the requested information by unicast is proposed. A neighbor base station information acquiring method according to the present embodiment is described with reference to FIG. 4 as follows.

Figure 4:
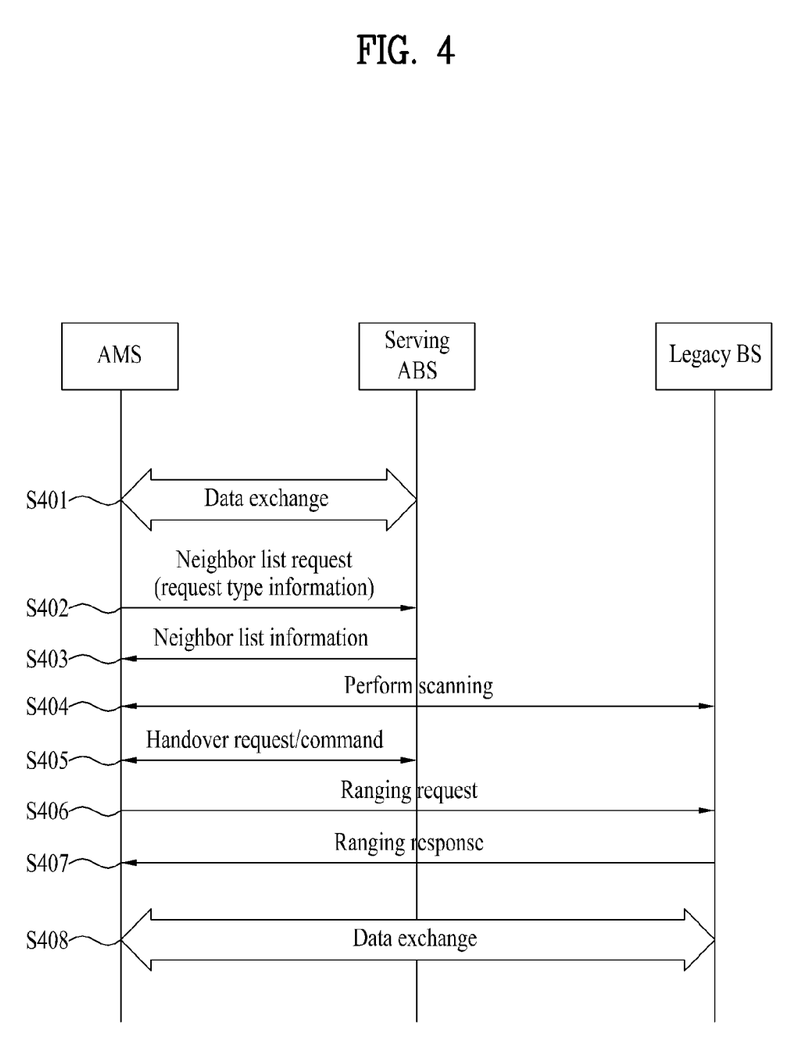
FIG. 4 shows one example of a procedure for an advanced mobile station to acquire legacy base station information and a corresponding handover procedure according to another embodiment of the present invention.

FIG. 4 shows one example of a procedure for an advanced mobile station to acquire legacy base station information and a corresponding handover procedure according to another embodiment of the present invention.

Referring to FIG. 4, while a mobile station (AMS) is receiving a service via a serving advance base station (ABS) [S401], it may be able to request for information (e.g., neighbor base station list) on a neighbor legacy base station to the serving ABS [S402]. In doing so, the request for the legacy base station information may be performed via a newly defined medium access control (MAC) management message. Moreover, a base station type information (Neighbor_Request_BS_Type) field is included in the corresponding message and a value of the corresponding field may be set to a value indicated by the legacy base station.

Hence, the serving ABS may be able to transmit the legacy base station information requested by the mobile station to the mobile station in form of a unicast MAC message [S403].

Using the acquired legacy base station information, the mobile station performs a scanning on the legacy base station [S404]. The mobile station may be then able to perform a handover into the corresponding legacy base station [S405 to S408].

Since the steps S405 to S408 shown are similar to the former steps S205 to S208 described with reference to FIG. 2, respectively, their duplicative details shall be omitted for clarity of the following description.

Meanwhile, the aforementioned base station type information (Neighbor_Request_BS_Type) may indicate a type of a femto base station instead of indicating whether the legacy base station is an advanced base station. For instance, if types of a femto base station are categorized into a closed subscriber group-closed femto base station (CSG-Closed Femto ABS), a closed subscriber group-open femto base station (CSG-Open Femto ABS) and an open subscriber group femto base station (OSG Femto ABS), at least one group may be indicated by the base station type information.

Moreover, instead of a new MAC management message, it may be able to use a previous MAC message. For instance, in order to request a neighbor base station information, it may be able to use a scan reporting (AAI-SCN-REP) message. For another instance, in order to deliver a neighbor base station information to a mobile station, it may be able to use a neighbor advertisement (AAI_NBR-ADV) message sent by unicast.

Therefore, a mobile station specifies a type of a femto base station via a base station type information of AAI_SCN-REP message and may be then able to make a request for an information (list) of a neighbor femto base station to a serving ABS. In response to the request, a base station may be able to send AAI_NBR-ADV message including the information (list) of the femto base station of the corresponding type to the mobile station by unicast.

Configurations of Mobile and Base Stations

In the following description, a mobile station and a base station (FBS or MBS) for implementing the above-mentioned embodiments of the present invention according to another embodiment of the present invention are explained.

First of all, a mobile station may work as a transmitter in uplink or may work as a receiver in downlink. A base station may work as a receiver in uplink or may work as a transmitter in downlink. In particular, each of the mobile station and the base station may include a transmitter and a receiver for transmission of information and/or data.

Figure 5:
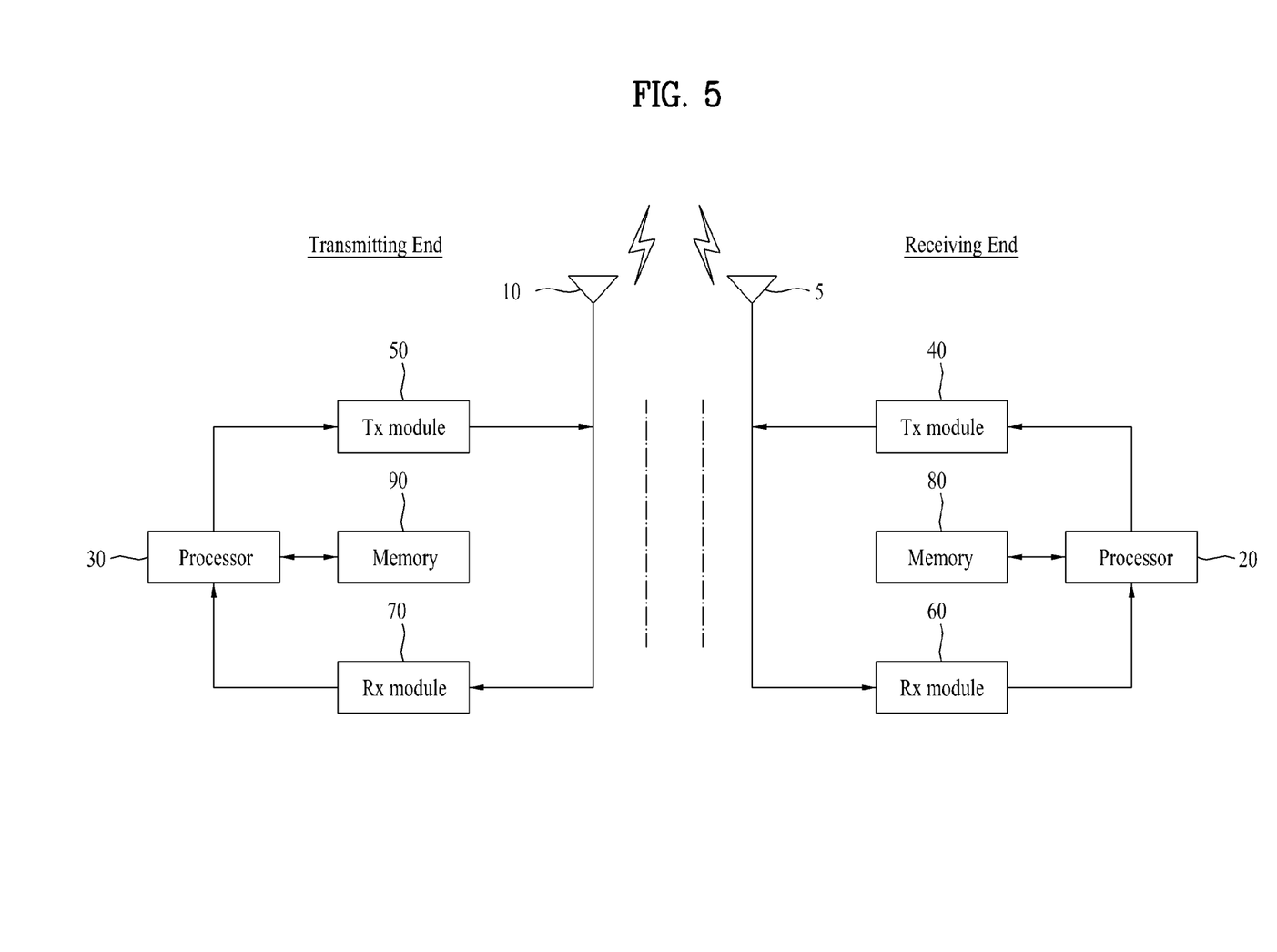
FIG. 5 is a block diagram for one example of configurations of transmitting and receiving ends according to another embodiment of the present invention.

Each of the transmitter and the receiver may include a processor, a module, a part and/pr a means for performing embodiments of the present invention. In particular, each of the transmitter and the receiver can include a module (means) for encrypting a message, a module for interpreting the encrypted message, an antenna for transceiving the message and the like. One example of the transmitting and receiving ends is described with reference to FIG. 6 as follows.

FIG. 5 is a block diagram for one example of configurations of transmitting and receiving ends according to another embodiment of the present invention.

Referring to FIG. 5, a left part of the drawing represents a configuration of a transmitting end, while a right part of the drawing represents a configuration of a receiving end. Each of the transmitting and receiving ends may include an antenna 5/10, a processor 20/30, a transmitting module (Tx module) 40/50, a receiving module (Rx module) 60/70 and a memory 80/90. In this case, the respective components may perform corresponding functions. The respective components are described in detail as follows.

First of all, the antenna 5/10 externally transmits a signal generated from the transmitting module 40/50. And, the antenna 5/10 receives a radio signal from outside and then delivers the received radio signal to the receiving module 60/70. In case that a multiple-antenna (MIMO) function is supported, at least two antennas may be provided.

The antenna, the transmitting module and the receiving module may be integrated into a radio communication (RF) module.

The processor 20/30 generally controls overall operations of a mobile terminal. In particular, the processor 20/30 may be able to perform a control function for performing the above-described embodiments of the present invention, a MAC (medium access control) frame variable control function according to service characteristics and propagation environment, a handover function, an authentication function, an encryption function and the like. In particular, the processor 20/20 may perform overall controls to perform the handover through the zone switching shown in FIGS. 2 to 4.

In more particular, the processor of the mobile terminal (AMS) acquires scheduling information of MOB_NBR-ADV message included in AAI_NBR-ADV message received from MZone of ABS operating in a mixed mode, receives the MOB_NBR-ADV message of LZone at the time indicated by the scheduling information, and may control neighbor legacy base station information to be acquired.

Besides, the processor of the mobile station may be able to perform overall control operations of the operating steps disclosed in the aforementioned embodiments.

The transmitting module 40/50 performs prescribed coding and modulation on a signal and/or data, which is scheduled by the processor 20/30 and will be then transmitted externally, and is then able to deliver the coded and modulated signal and/or data to the antenna 10.

The receiving module 60/70 reconstructs the radio signal received externally via the antenna 5/10 into original data in a manner of performing decoding and demodulation on the received radio signal and is then able to deliver the reconstructed original data to the processor 20/30.

The memory 80/90 may store programs for the processing and control of the processor 20/30 and is able to perform a function of temporarily storing input/output data. And, the memory 80/90 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Meanwhile, the base station may perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like using at least one of the modules mentioned in the foregoing description and may further include means, modules, parts and/or the like to perform these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, a more efficient neighbor legacy base station information acquiring method in a broadband wireless access system, a handover performing procedure using the same and a device configuration for the same are described with reference to the examples applied to IEEE 802.16m system and may be applicable to various mobile communication systems including 3GPP/3GPP2 and the like as well as IEEE 802.xx systems.

What is claimed is:

1. A method of receiving information on a neighbor base station by a mobile station from a serving base station supporting a first zone used for a first communication scheme and a second zone used for a second communication scheme in a mobile communication system, the method comprising:

receiving a second message including system information of one or more second neighbor base stations supporting the second zone from the second zone of the serving base station;

checking an existence of one or more first neighbor base stations supporting the first zone based on whether the second message includes first time information indicating a broadcasting time of a first message to be broadcast from the first zone of the serving base station; and receiving the first message from the first zone of the serving base station using the first time information, if the second message includes the first time information, wherein the first message includes system information of the one or more first neighbor base stations supporting the first zone.

2. The method of claim 1, wherein the first time information comprises at least one offset information or interval information, the offset information indicating the time of the first message as an offset from a predetermined time, the interval information indicating a broadcasting interval of the first message.

3. The method of claim 2, wherein each of the offset information and the interval information is determined by a frame unit.

4. The method of claim 3, wherein the second message further includes second time information indicating a broadcasting time of system information of the first zone of the serving base station, and wherein the method further comprises receiving the system information of the first zone of the serving base station using the second time information.

5. The method of claim 1, wherein the first communication scheme corresponds to WirelessMAN-OFDMA R1 reference system, wherein the second communication scheme corresponds to IEEE 802.16m system, wherein the first message comprises a neighbor advertisement (MOB_NBR-ADV) message, and wherein the second message comprises an advanced neighbor advertisement (AAI_NBR-ADV) message.

6. A mobile station device, which receives information on a neighbor base station from a serving base station supporting a first zone used for a first communication scheme and a second zone used for a second communication scheme in a mobile communication system, the mobile station device comprising:

a processor; and a radio communication (RF) module configured to transceive radio signals with the serving base station under control of the processor, wherein the processor controls the radio communication (RF) module to receive a second message including system information of one or more second neighbor base stations supporting the second zone from the second zone of the serving base station, and checks an existence of one or more first neighbor base stations supporting the first zone based on whether the second message includes first time information indicating a broadcasting time of a first message to be broadcast from the first zone of the serving base station, wherein the processor controls the RF module to receive the first message from the first zone of the serving base station using the first time information, if the second message includes the first time information, and wherein the first message includes system information of the one or more first neighbor base stations supporting the first zone.

7. The mobile station device of claim 6, wherein the first time information comprises at least offset information or interval information, the offset information indicating the broadcasting time of the first message as an offset from a predetermined time, the interval information indicating a broadcasting interval of the first message.

8. The mobile station device of claim 7, wherein each of the offset information and the interval information is determined by a frame unit.

9. The mobile station device of claim 8,
wherein the second message further includes second time information indicating a broadcasting time of system information of the first zone of the serving base station, and
wherein the processor controls the system information of the first zone of the serving base station to be received using the second time information.

10. The mobile station device of claim 6,
wherein the first communication scheme corresponds to WirelessMAN-OFDMA R1 reference system,
wherein the second communication scheme corresponds to IEEE 802.16m system,
wherein the first message comprises a neighbor advertisement (MOB_NBR-ADV) message, and
wherein the second message comprises an advanced neighbor advertisement (AAI_NBR-ADV) message.

* * * * *